United States Patent [19]

Shackleford

[11] 3,753,122

[45] Aug. 14, 1973

[54] FREQUENCY RESPONSIVE RADIO ACTUATOR FOR AUTOMATICALLY CONNECTING THE RECEIVER PORTION AND THE AUDIO PORTION

[76] Inventor: Kenneth C. Shackleford, P.O. Box 777, Camden, Ark. 71701

[22] Filed: Mar. 31, 1971

[21] Appl. No.: 129,703

[52] U.S. Cl. .................. 325/466

[51] Int. Cl. .................. H04b 1/06

[58] Field of Search .................. 325/55, 63, 64, 466, 325/469, 468

[56] References Cited

UNITED STATES PATENTS

| | | | |
|---|---|---|---|
| 2,929,921 | 3/1960 | Clark | 325/466 |
| 3,131,354 | 4/1964 | Battin | 325/466 |
| 3,121,841 | 2/1964 | Craig et al. | 325/466 |

*Primary Examiner*—Albert J. Mayer

*Attorney*—Dunlap, Laney, Hessin & Dougherty

[57] ABSTRACT

A radio actuator interposed between the receiver portion and the audio output portion of a radio to automatically establish electrical continuity therebetween when a signal having a predetermined actuating frequency is received by the receiver portion of the radio. The radio actuator has an amplifier network connected to the receiver portion to amplify the received signal, the amplified signal being transferred through an impedance matching network and a notch filter network to a switching transistor, the impedance matching network and the notch filter network cooperating to produce a maximum power transfer or gain thereacross at an actuating power level when the transferred signal has a frequency substantially the same as the actuating frequency. A signal having a power level substantially equal to the actuating power level drives the switching transistor into the saturation region passing current via the collector to a relay coil, thereby energizing the relay coil. The relay coil has a set of cooperating relay contacts interposed between the receiver portion and the audio output portion of the radio, the cooperating contacts being moved to the closed position in the energized position of the relay coil, thereby automatically turning the radio to an "on" position.

11 Claims, 1 Drawing Figure

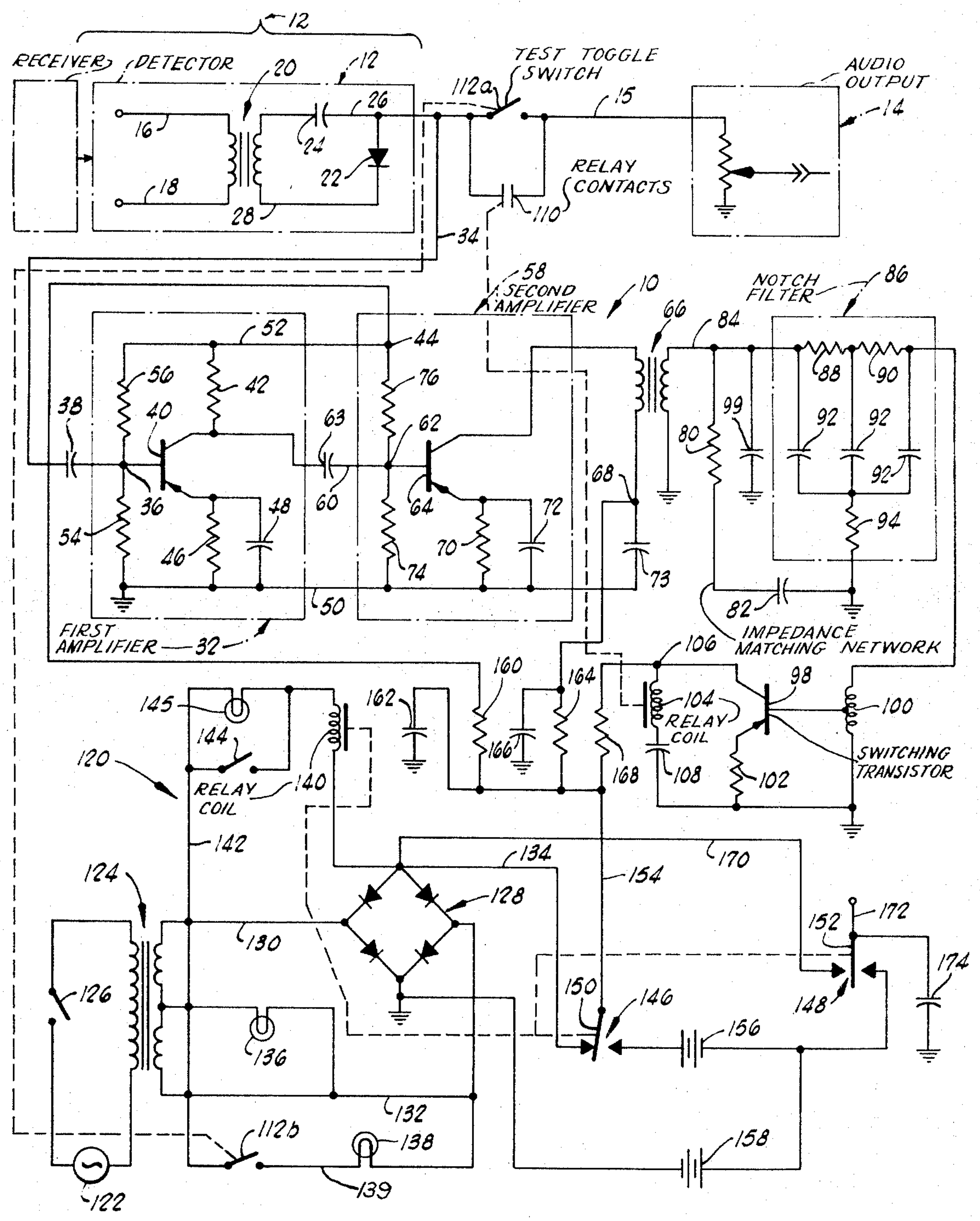
INVENTOR
KENNETH C. SHACKLEFORD
BY Dunlap, Laney, Hessin & Dougherty
ATTORNEYS

FREQUENCY RESPONSIVE RADIO ACTUATOR FOR AUTOMATICALLY CONNECTING THE RECEIVER PORTION AND THE AUDIO PORTION

BACKGROUND OF THE INVENTION

1. Field of the Invention

This invention relates generally to improvements in radio actuating apparatus, and more particularly, but not by way of limitation, to a radio actuator to automatically turn a radio "on" upon receiving a signal having a predetermined actuating frequency.

2. Description of the Prior Art

In the past, there have been various devices and apparatus constructed to automatically turn a radio to the "on" position upon the happening of a predetermined event. Such devices have been basically designed to function in an alert system, whereby the radio receivers in the possession of various individuals are automatically actuated to receive information broadcasted by an emergency broadcast station.

Some of these systems, in the past, have been frequency responsive, that is actuated upon receiving a signal having a particular frequency. Many of these systems have utilized complicated circuitry which would be difficult to incorporate in existing radios, and most have not included adequate test facilities and stand-by power facilities which are deemed to be necessary in a safe, reliable alert system.

SUMMARY OF THE INVENTION

An object of the invention is to provide a radio actuator to automatically establish electrical continuity between a radio receiver and the audio output portion upon receiving a signal having a predetermined actuating frequency.

Another object of the invention is to provide a radio actuator having a stand-by operating power supply.

A further object of the invention is to provide a radio actuator having adequate test facilities to assure proper operation in the event an actuating signal is received.

A still further object of the invention is to provide a radio actuator which is economical in construction and operation.

Other objects and advantages of the invention will be evident from the following detailed description when read in conjunction with the accompanying drawing which illustrates a preferred embodiment of the invention.

BRIEF DESCRIPTION OF THE DRAWING

The single FIGURE in the drawing, schematically illustrates a radio actuator constructed in accordance with the present invention.

DESCRIPTION OF THE PREFERRED EMBODIMENT

Referring to the drawing, shown therein and designated by the general reference numeral 10, is a frequency responsive radio actuator constructed in accordance with the present invention. The radio actuator 10 is constructed to automatically connect a receiver portion of a radio, designated in the drawing by the general reference 12, to the audio-output portion of the radio, designated in the drawing by the general reference 14, via a conductor 15 in response to an input signal received via the antenna (not shown) having a predetermined actuating frequency. More particularly, when the radio actuator 10 is positioned in a deactuated status, to be more fully described below, the radio will operate in a normal manner; however, when the radio actuator 10 is positioned in an actuated or alert status, electrical continuity will be established between the receiver 12 and the audio-output 14 via the conductor 15 in response to an input signal having a predetermined actuating frequency.

A portion of the receiver 12 is partially-schematically shown in the drawing and, more particularly, a pair of conductors 16 and 18 are shown connected to the primary coil of a transformer 20. The conductors 16 and 18 provide the interconnection between a demodulation or detection stage (not shown) of a radio and the transformer 20.

The secondary coil of the transformer 20 is connected to a diode 22 and a capacitor 24 via a pair of conductors 26 and 28, which are connected to the conductor 15. The diode 22 and the capacitor 24 are connected in parallel, as shown in the drawing, and provide a filter network for the demodulated signal, in a manner well known in the art.

The signal output of the receiver 12 is coupled to a first amplifier 32 via a conductor 34 which is connected on one end thereof to a junction 36. The opposite end of the conductor 34 is connected to the conductor 15, generally between the demodulation stage of the receiver 12 and the audio output 14. A capacitor 38 is interposed in the conductor 34 generally between the conductor 15 and the first amplifier 32 and, thus, the signal output from the receiver 12, is, more particularly, capacitor-coupled to the first amplifier 32.

The first amplifier 32 basically comprises: a pnp type of transistor 40, having a base connected to the junction 36, a collector connected through a load resistor 42 to a junction 44, and an emitter returned to ground via a current stabilizing resistor 46 connected in parallel with a by-pass capacitor 48. The junction 44 is connected to a negative, direct-current power source, commonly referred to in the art simply as the B-supply, which will be described in greater detail below.

More particularly, as shown in the drawing, the resistor 46 and the capacitor 48 are connected to a conductor 50 which is connected to ground. The load resistor 42 is more particularly, connected to a conductor 52, the conductor 52 being connected to the junction 44, as shown in the drawing.

A base biasing resistor 54 is connected on one side thereof to the junction 36 and on the opposite side thereof to ground. The first amplifier 32 also includes a resistor 56 which is connected on one side thereof to the junction 36 and on the opposite side thereof to the conductor 52.

The output of the first amplifier 32 is coupled to a second amplifier 58 via a conductor 60 which is, more particularly, connected to a junction 62 of the second amplifier 58. A capacitor 63 is interposed in the conductor 60 generally between the junction 62 and the transistor 40 and, thus, the first amplifier 32 is, more particularly, capacitor-coupled to the second amplifier 58, as shown in the drawing.

The first amplifier 32 is adapted to receive a signal via the signal input thereto or, in other words, via the conductor 34 and to amplify the received signal. The amplified signal from the signal output of the first amplifier 32 is then capacitor-coupled to the signal input of the second amplifier 58 or, in other words, received by the second amplifier 58 via the conductor 60.

The second amplifier 58 also includes a pnp type of transistor 64 having a base connected to the junction 62, a collector connected through the primary coil of an audio transformer 66 to the direct-current power supply via a junction 68, and an emitter returned to ground via a current stabilizing resistor 70 connected in parallel with a by-pass capacitor 72. The resistor 70 and the capacitor 72 are, more particularly, each connected to ground via the conductor 50, as shown in the drawing. As shown in the drawing, a direct-current filter capacitor 73 is connected on one side thereof to the junction 68, and on the opposite side thereof to ground.

A base biasing resistor 74 is connected on one side thereof to the junction 62 and on the opposite side thereof to ground via the conductor 50. The second amplifier also includes a resistor 76 which is connected on one side thereof to the junction 62 and on the opposite side thereof to the direct-current power supply via the junction 44.

The second amplifier 58 is adapted to receive the amplified signal from the first amplifier 32, as mentioned above, and to further amplify the received signal. The amplified signal output of the second amplifier 58 is then connected to the transformer 66. The utilization of transistor constructed amplifiers, such as described above with respect to the first amplifier 32 and the second amplifier 58, is well known in the art, and a detailed description of the construction and operation thereof is not required herein.

An impedance matching network is connected to the signal output of the second amplifier 58 and, more particularly, a resistor 80 is connected in series with a capacitor 82, the resistor 80 and the capacitor 82 being connected in parallel with the secondary coil of the transformer 66 via a conductor 84. The secondary coil of the transformer 66 and the resistor 80 and the capacitor 82 are also each connected to ground, as shown in the drawing. The impedance matching network is constructed and positioned with respect to the second amplifier 58 to transform the load impedance of the impedance matching network to a conjugate match of the impedance imposed on the signal output of the second amplifier 58, when the signal received from the second amplifier 58 has a frequency substantially the same as the predetermined actuating frequency of the radio actuator 10.

The impedance matching network is also connected to a notch filter 86 via the conductor 84. The notch filter 86 basically includes, a pair of resistors 88 and 90 interposed in series with the conductor 84, and three capacitors 92 connected in parallel, each capacitor 92 being connected on one side thereof to ground through a resistor 94. More particularly, as shown in the drawing, one of the capacitors 92 is connected to the conductor 84 generally between the secondary coil of the transformer 66 and the pair of resistors 88 and 90; one of the capacitors 92 is connected to the conductor 84 generally between the pair of resistors 88 and 90; and one of the capacitors 92 is connected to the conductor 84 generally between the pair of resistors 88 and 90 and a switching transistor 98. A direct-current filter capacitor 99 is connected on one side thereof to the conductor 84 and on the opposite side thereof to ground, as shown in the drawing.

The notch filter 86 is designed and connected, and, more particularly, the components therein are sized, to pass a signal having a frequency substantially the same as the predetermined actuating frequency of the radio actuator 10 at a maximum transferred power level and to pass signals having frequencies other than the predetermined actuating frequency at a power level substantially less than the maximum transferred power level. More particularly, the notch filter 86 is sized to cooperate with the impedance matching network to pass a signal having a frequency substantially the same as the predetermined actuating frequency at an actuating power level, and to pass signals having frequencies other than the actuating frequency at a nonactuating power level. Thus, at the actuating frequency, a signal is transferred through the impedance matching network and the notch filter 86 at a maximum gain, the notch filter 86 cooperating with the impedance matching network to substantially block signals having frequencies other than the actuating frequency.

For example, if the predetermined actuating frequency is determined to be 1,000 cycles per second: the capacitor 82 will have a value of approximately 0.1 micro-farad; the resistor 80 will have a value of approximately 4.7 kilohms; and the transformer 66 will be an audio transformer turned to 1,000 cycles per second. In the notch filter 86, the value of the components would be essentially as follows: the resistors 88 and 90 would be approximately 47 kilohms; and the capacitors 92 would be approximately 0.001 micro-farad.

In this example, and utilizing a particular amplifier staging for the first transistor amplifier 32 and the second transistor amplifier 58, the gain transferred through the impedance matching network and the notch filter 86 was found to be approximately 40db. At signal frequencies other than the actuating frequency of the radio actuator 10, that is 1,000 cycles per second in this example, the gain through the impedance matching network and the notch filter 86 was found to be approximately 8db.

The signal from the notch filter 86 is directly coupled to the base of the switching transistor 98 via a tap from a coil 100, as shown in the drawing. The coil 100 is sized to cooperate with the impedance matching network and the notch filter 86 to bias the base of the switching transistor 98 to a point wherein the switching transistor 98 is operating in the cut-off region when the signal input to the impedance matching network and the notch filter 86 is at some frequency other than the actuating frequency of the radio actuator 10. The coil 100 is also sized to cooperate with the impedance matching network and the notch filter 86 to drive the switching transistor 98 into the saturation region when the signal input to the impedance matching network and the notch filter has a frequency substantially the same as the actuating frequency of the radio actuator 10 or, in other words, when a signal having a power level substantially the same as the actuating power level drives the switching transistor 98 via the coil 100.

Utilizing the example noted above, wherein the actuating frequency of the radio actuator 10 was assumed to be 1,000 cycles per second, the switching transistor 98 would be biased "on" or driven into the saturation region upon a signal having approximately a 40db power level being transferred to the operating coil 100. The switching transistor 98, in this example, would be sized to operate in the "cutoff" region when signals having a power level of substantially less than 40db are transferred to the operating coil 100.

As shown in the drawing, an emitter stabilizing resistor 102 is connected to the emitter of the switching transistor 98 and to ground, and the collector of the switching transistor 98 is connected to a relay coil 104. The relay coil 104 is connected to a junction 106, which is connected to the direct-current operating power supply, in a manner to be described in more detail below. The relay coil 104 is also connected to ground through a capacitor 108.

The relay coil 104 is thus connected to the output of the switching transistor 98, and has a energized position and a de-energized position, the relay coil 104 being energized via the switching transistor 98 when the switching transistor 98 is being operated in the saturation region.

A set of relay contacts 110 are operably connected to the relay coil 104 and, as shown in the drawing, the relay contacts are normally open. More particularly, the relay contacts 110 are open in the de-energized position of the relay coil 104, for reasons which will be made apparent below.

As shown in the drawing, the relay contacts 110 are interposed in the conductor 15, generally between the receiver 12 and the audio-output 14. Thus, in the deenergized position of the relay coil 104, the relay contacts 110 are open, thereby disconnecting the receiver 12 from audio-output 14. It will be apparent from the foregoing to those skilled in the art, that when the operating coil 104 is energized, the relay contacts 110 will be closed, thereby establishing electrical continuity or in other words, connecting the receiver 12 to the audio-output 14. In the energized position of the relay coil 104, the signal received by the receiver 12 is thus reproduced or made audible via the audio-output 14, in a manner well known in the art.

As shown in the drawing, the relay contacts 110 are connected in parallel with a test toggle switch **112*a*. The test toggle switch 112*a*, as shown in the drawing, is in the non-operating position and, in that position, the test toggle switch 112*a* is open. From the foregoing, it will be apparent that electrical continuity will be established between the receiver 12 and the audio-output 14 in the closed position of the test toggle switch 112*a* and, in that position of the test toggle switch 112*a*,** the radio can be turned to a particular emergency broadcast station, for reasons to be made more apparent below.

A direct-current power supply 120 is schematically shown in the drawing and is constructed to provide the direct-current operating power for the radio actuator 10 by transforming an alternating-current supplied by an alternating-current power supply source to essentially a direct-current output of a predetermined value, or to provide the direct-current operating power via a battery supply in the event the alternating-current power supply fails, in a manner to be described in detail below.

As shown in the drawing, an alternating-current power supply 122 is connected to the primary of a transformer 124 via a switch 126. The alternating-current power supply 122 is transformer coupled to a full-wave rectifier 128 via a pair of conductors 130 and 132. The full-wave rectifier 128 operates, in a manner well known in the art, to convert the alternating-current supplied thereto to substantially a direct-current output therefrom, the direct-current output from the full-wave rectifier 128 being provided via the conductor 134.

An indicator lamp 136 is connected on one side thereof to a center tap of the secondary coil of the transformer 124, and on the opposite side thereof to the conductor 132. The indicator lamp 136 is energized in the closed position of the main power switch 126, thereby providing a visual indication that the operating power is connected to the radio actuator 10 or, in other words, that the operating power is in the "on" position.

A test indicator lamp 138 is connected to the conductor 132 via a conductor 139. As shown in the drawing, a test toggle switch **112*b* is also interposed in the conductor 139 in series with the test indicator lamp 138. The test indicator lamp 138 thus provides a visual indication that the test toggle switch 112*b*** is in the closed position, for the reasons which will be made more apparent below.

In a preferred form, the test toggle switch **112*a* and the test toggle switch 112*b* comprise a single switch, the switches 112*a* and 112*b* schematically representing the electrical interconnection of the test toggle switch in the conductor 15 and in the conductor 139. The switches 112*a* and 112*b* will, therefore, sometimes be referred to below simply as the test toggle switch 112.**

A relay coil 140 is connected to the secondary coil of the transformer 124 via a conductor 142. A battery test switch 144 is interposed in the conductor 142, generally between the transformer 124 and the relay coil 140. As shown in the drawing, the battery test switch 144 is in the open or the operating position. In the closed or operating position of the battery test switch 144, the relay coil 140 is energized, for reasons to be made more apparent below.

A battery test lamp indicator 145 is connected in parallel with the battery test switch 144, as shown in the drawing. In the closed position of the battery test switch 144, the conductor 142 is short-circuited around the battery test lamp indicator 145, and the battery test lamp indicator lamp 145 is thus de-energized. In the open position of the battery test switch 144, the battery test lamp indicator 145 is energized, thereby providing a visual output indication that the battery test switch 144 is in the open position, and the power drop across the battery test lamp indicator 145 is of a sufficient level that the relay coil 140 is de-energized, for reasons to be made more apparent below.

As shown in the drawing, the relay coil 140 has two sets of cooperating relay contacts 146 and 148. The relay contacts 146 cooperate with a switch arm 150 and the relay contacts 148 cooperate with a switch arm 152. The relay contacts 148 are shown in the drawing in a non-operating position, as will be described in greater detail below.

The relay contacts 146 are shown in the drawing, in the energized position of the relay coil 140, and in that position, the switch arm 150 has been positioned with respect to the relay contacts 146 to establish electrical continuity between the alternating-current power supply 122 and the radio actuator 10 via the full-wave rectifier 128 and the conductor 154.

In the de-energized position of the relay coil 140, the switch arm 150 is positioned with respect to the relay contacts 146 to establish electrical continuity between a pair of batteries 156 and 158 which are connected in series, the pair of batteries 156 and 158 thus supplying the direct-current operating power for the radio actuator 10 via the conductor 154. It is apparent from the foregoing, that when the relay coil 140 is de-energized, the direct-current power supply 120 is battery operated via the batteries 156 and 158.

The direct-current power supply 120 and, more particularly, the conductor 154 is connected to the junction 44 via a load-dropping resistor 160, having a by-pass capacitor 162 connected in parallel therewith and to ground; to the junction 68 via a load-dropping resistor 164, having a by-pass capacitor 166 connected in parallel therewith and to ground; and to the junction 106 via a load-dropping resistor 168, as shown in the drawing. Each resistor 160, 164, and 168 is sized to drop a predetermined amount of the power thereacross, so that a predetermined direct-current operating power is supplied to each terminal or junction 44, 68 and 106 to operatingly cooperate in the radio actuator 10, in a manner well known in the art.

As mentioned before, the relay contacts 148 are shown in a non-operating position in the drawing. More particularly, the relay contacts 148 are not operably connected to the direct-current power supply 120. In a preferred form, the relay contacts 148 are provided with the radio actuator 10 so that when the relay contacts 148 are operably connected to the relay coil 140, the relay switch arm 152 cooperates with the relay contacts 148 to establish electrical continuity between the alternating-current power supply 122 and the radio actuator 10 via the full-wave rectifier 128 and a pair of conductors 170 and 172 in an energized position of the relay coil 140. In a de-energized position of the relay coil 140, the switch arm 152 cooperates with the relay contacts 148 to establish electrical continuity between the battery 158 and the conductor 172. A direct-current filter capacitor 174 is connected on one side thereof to the conductor 172, and on the opposite side thereof to ground. In this manner, the radio actuator 10 can be constructed to operate, for example, on a 9 volt or an 18 volt direct-current power supply, and only minor wiring changes are necessary to effect the conversion.

OPERATION OF THE PREFERRED EMBODIMENT

As mentioned before, the radio actuator 10 is constructed to automatically connect the receiver portion 12 of a radio to the audio output portion 14, upon receiving a signal having a predetermined actuating frequency. When a signal having a frequency substantially the same as the predetermined actuating frequency is received by the receiver 12, the switching transistor 98 is biased into the "on" position or, in other words, biased into the saturation region, thereby energizing the relay coil 104. In the energized position of the coil 104, the cooperating relay contacts 110 are closed. The closing of the relay contacts 110 establishes electrical continuity between the receiver 12 and the audio output 14 of the radio via the conductor 15. The audio output 14 of the radio will then broadcast the tone produced by the signal having the predetermined actuating frequency and, of course, will also audibly broadcast any message which is transmitted by the particular emergency transmitting station.

In describing the initial operation of the radio actuator 10, it will be assumed that the radio and the radio actuator 10 are to be operated from the alternating-current power supply 122. In this event, the main power supply switch 126 is initially moved to the closed position, thereby connecting the power source 122 to the full-wave rectifier 128 via the transformer 124, as shown in the drawing. In this position, the battery test toggle 144 will be in the closed position and the test toggle switch 112 will be in the open position. With the alternating-current supply 122 connected to the full-wave rectifier 128 and the various switches in the initial position, as described above, the direct-current operating power for the radio and the radio actuator 10 will be supplied thereto via the conductor 154.

The operator will then move the test toggle switch 112 to the closed position, thereby establishing electrical continuity between the receiver 12 and the audio output 14 via the test toggle switch 12. With the test toggle switch 112 in the closed position, the operator will then tune the radio to a predetermined emergency broadcast station, and set the volume control of the radio at the desired level.

After the radio has been tuned, as described above, the operator will then move the test toggle switch 112 to the open position, thereby interrupting the electrical continuity between the receiver portion 12 and the audio output portion 14 of the radio. After the test toggle switch 112 has been opened, the radio actuator 10 is positioned in an alert status. In this position, the relay coil 104 will be in the de-energized position, and the relay contacts 110 will be opened. It should be particularly noted, that in the closed position of the test toggle switch 112, the test indicator lamp 138 will be energized, thereby providing a visual indication that the radio is in a preset or test position.

Thus, in the alert operating position, as described above, the radio will be tuned to the predetermined emergency broadcasting station and the receiver portion 12 will be disconnected from the audio output portion 14 of the radio. In this position of the radio actuator 10, the receiver portion 12 will remain disconnected from the audio output portion 14 of the radio, until such time as the receiver portion 12 receives a signal from the broadcast station previously tuned-in, more particularly, a signal having a frequency substantially the same as the actuating frequency of the radio actuator 10.

The signal received by the receiver portion 12 is capacitor-coupled to the first amplifier 32 via the conductor 34 through the capacitor 38. The amplified signal from the amplifier 32 is capacitor-coupled to the second amplifier 58 via the conductor 60. The output of the second amplifier 58 is inductively coupled to the impedance matching network and to the notch filter 86 via the audio transformer 66.

Assuming the signal received by the receiver portion 12 has a frequency substantially equal to the actuating frequency of the radio actuator 10, the load impedance of the impedance matching network will be transformed to a value which produces a conjugate match of the internal impedance of the power output of the second amplifier 58 through the transformer 66. Thus, when a signal having such a frequency is amplified by the second amplifier 58, it is transferred at a maximum power gain through the impedance matching network and the notch filter 86. The notch filter 86 cooperates with the impedance matching network to block signals having a frequency other than the actuating frequency or, more particularly, to pass such signals at a reduced power gain.

When a signal having a frequency substantially equal to the actuating frequency is passed through the impedance matching network and the notch filter 86, the gain of the signal transferred to the operating coil 100 is at a sufficient power level to drive the switching transistor 98 into the "on" position, thereby passing energizing current through the relay coil 104. In the energized position of the relay coil 104, the cooperating relay contacts 110 will be moved to the closed position, thereby establishing electrical continuity between the receiver 12 and the audio output 14. Thus, the radio actuator 10 operates to automatically position the radio in the "on" position, upon receiving a signal having a predetermined actuating frequency.

When a signal having a frequency at a level other than the actuating frequency is passed through the first amplifier 32 and the second amplifier 58, the load impedance of the impedance matching network will not be transformed to produce a conjugate match of the impedance of the output signal of the second amplifier 58. The impedance matching network and the notch filter 86 thus cooperate to transfer such a signal at a significantly reduced power gain. The reduced power gain is not sufficient to drive the switching transistor 98 into the saturation region.

It should be noted that once the switching transistor 98 has been driven into the saturation region or to the "on" position, the relay coil 104 will remain in the energized position until such time as the power is disconnected from the radio actuator 10.

The battery test switch 144 will remain in the closed position during the normal operation of the radio, and when the radio or, more particularly, the radio actuator 10 is positioned in the alert or actuated status, described above. After the radio has been tuned to the emergency broadcast station, and the test toggle 112 has been moved to the open position, should a power failure occur or, in other words, should the alternating-current power source 122 fail for any reason, the coil 140 will be de-energized.

In the de-energized position of the coil 140, the switch arm 150 will be moved to a position wherein the batteries 156 and 158 are connected in series to supply the direct-current operating power for the radio actuator 10 via the conductor 154. In this position, the radio and the radio actuator 10 will be battery operated or, more particularly, the direct-current operating power for the radio and the radio actuator 10 will be supplied by the batteries 156 and 158.

It is apparent from the foregoing, that the radio actuator 10 and, more particularly, the direct-current power supply 120 thereof is constructed such that the radio actuator 10 will be energized thereby automatically connecting the receiver portion 12 to the audio output portion 14, even in the event there is a failure of the alternating-current power supply 122. The relay coil 140 and the cooperating relay contacts 146 and 148, thus cooperate with the batteries 156 and 158 to provide an emergency stand-by direct-current operating supply.

When the operator closes the test toggle switch 112 and initially tunes the radio to the emergency transmitting station, the operator can also check or establish that the batteries 156 and 158 are operational. To check the batteries 156 and 158, the operator will open the battery test toggle switch 144, thereby de-energizing the operating coil 140. When the operating coil 140 is de-energized, the relay switch arm 150 cooperates with the contacts 146 to connect the batteries 156 and 158 to provide the direct-current operating power for the radio actuator 10, in a manner as described above. When the battery test toggle switch 144 is in the open or test position, the battery test lamp indicator 145 will be energized, thereby alerting the operator that the batteries 156 and 158 are operably connected in the radio actuator 10.

The radio actuator 10, described in detail above, thus establishes electrical continuity between the receiver 12 and the audio output 14 upon receiving a signal having a predetermined actuating frequency, and also includes sufficient indications, which are perceivable by the operator, to inform the operator of the particular status of the radio actuator 10. The radio actuator 10 also includes a stand-by operating power supply, and is adapted to be automatically switched thereto upon a failure of the primary operating power supply.

Changes may be made in the construction of the various parts or the elements as disclosed herein without departing from the spirit and scope of the invention as defined in the following claims.

What is claimed is:

1. A radio actuator to automatically provide electrical continuity between the receiver portion which includes a demodulation stage and the audio output portion of a radio in response to a signal having a predetermined actuating frequency being received by the receiver portion of the radio, the radio actuator comprising:

an amplifier means, having a signal input and a signal output, to receive a signal via the signal input and to amplify the received signal, the signal input of the amplifier means being connected to the radio generally between the demodulation stage and the audio output portion thereof;

an impedance matching network connected to the signal output of the amplifier means, the impedance matching network transforming the load impedance of the impedance matching network to a conjugate match of the impedance of the signal output of the amplifier means at a received signal frequency substantially the same as the actuating frequency of the radio actuator, thereby transferring maximum power across the impedance matching network at the actuating frequency;

a notch filter network connected to the impedance matching network constructed to pass a received signal having a frequency substantially the same as the actuating frequency of the radio actuator at a maximum transferred power level and to pass signals having frequencies other than the actuating frequency of the radio at a power level substantially less than the maximum transferred power level, the notch filter sized to cooperate with the impedance matching network to pass a signal having a frequency substantially the same as the actuating frequency at an actuating power level and to pass signals having a frequency other than the actuating frequency at a non-actuating power level;

a swtiching transistor means, having an input and an output, the input being connected to the notch filter network, the switching transistor being driven into the saturation region by a signal input having an actuating power level and being operated in the cut-off region by a signal input having a non-actuating power level;

a relay coil means connected to the output of the switching transistor means, the relay coil means having an energized and a de-energized position, the relay coil means being energized by the switching transistor means operating in the saturation region thereof; and a relay contact means operably connected to the relay coil means and being interposed between receiver portion and the audio output portion of the radio, the relay contact means being opened in the de-energized position of the relay coil means and being closed in the energized position of the relay coil means, electrical continuity between the receiver portion and the audio output portion of the radio being established in the closed position of the relay contact means.

2. The radio actuator of claim 1 defined further to include:

a test toggle switch connected in parallel with the relay contact means, having an opened and a closed position, electrical continuity between the receiver portion and the audio output portion of the radio being established in the closed position of the test toggle switch, the radio being tuneable to a broadcast station in the closed position of the test toggle switch.

3. The radio actuator of claim 2 defined further to include:

a direct-current power supply means to supply direct-current operating power for the radio actuator;

a test lamp indicator means in series with the test toggle switch and connected to the direct-current power supply means, electrical continuity being established between the test lamp indicator means and the direct-current power supply means in the closed position of the test toggle switch, the test lamp indicator means constructed to provide a visual output indication in the closed position of the test toggle switch.

4. The radio actuator of claim 1 wherein defined further to include: direct-current power supply means to supply direct-current operating power for the radio actuator adapted to essentially transform an alternating-current being supplied thereto from an alternating-current power supply means to a substantially direct-current output therefrom, and to be automatically switched from the alternating-current power supply means to a direct-current battery supply in the event the alternating-current power supply means fails, the direct-current power supply means including:

rectifier means connected to the alternating-current power supply means to convert the alternating-current supplied thereto to substantially a direct-current output therefrom;

relay coil means connected to the alternating-current power supply means having an energized position and a de-energized position, the relay coil means being energized by the alternating-current power supply means when in electrical continuity therewith;

relay contact means connected to the rectifier means and being inductively coupled to the relay coil means, the relay contact means establishing electrical continuity between the alternating-current power supply means and the radio actuator in an energized position of the relay coil means; and a direct-current battery means connected to the relay contact means for supplying direct-current operating power for the radio actuator in a de-energized position of the relay coil means.

5. The radio actuator of claim 4 defined further to include:

a battery test toggle switch connected in series with the relay coil means, the relay coil means being de-energized in open position of the battery test toggle switch.

6. The radio actuator of claim 1 wherein the amplifier means is defined further as being coupled via a transformer, having a primary coil and a secondary coil, to the impedance matching network, the primary coil of the transformer means being connected to the signal output of the amplifier means; and wherein the impedance matching network is further defined to include:

a resistor means connected in parallel with the secondary coil of the transformer; and a capacitor means connected in series with the resistor means.

7. The radio actuator of claim 6 wherein the notch filter is further defined to include:

a pair of resistor means connected in series with the secondary coil of the transformer means;

a capacitor means connected on one side thereof generally between the pair of resistor means and the secondary coil of the transformer means and on the opposite side thereof to ground;

a capacitor means connected on one side thereof generally between resistor means in said resistor means pair and on the opposite side thereof to ground; and a capacitor means connected on one side thereof generally between the pair of resistor means and the switching transistor means and to ground on the opposite side thereof.

8. The radio actuator of claim 7 wherein the notch filter means is defined further to include:

a resistor means connected between each capacitor means and ground.

9. The radio actuator of claim 1 defined further to include:

an operating coil connected to the notch filter, and being interposed generally between the notch filter and the switching transistor means; and wherein the base of the switching transistor means is defined further as being connected to the operating coil, the driving power for the switching transistor means being supplied through the notch filter via the operating coil.

10. The radio actuator of claim 9 wherein the operating coil is defined further as being sized to cooperate with the notch filter means and the impedance matching network to drive the switching transistor means into the saturation region upon the radio actuator receiving a signal having a frequency substantially equal to the actuating frequency of the radio actuator.

11. A radio actuator to automatically provide electrical continuity between the receiver portion which includes a demodulation stage and the audio output portion of a radio in response to a signal having a predetermined actuating frequency received by the receiver portion of the radio, said radio actuator comprising:

amplifier means having a signal input and a signal output to receive a signal via the signal input and to amplify the received signal, the signal input of the amplifier means being connected to the radio generally between the demodulation stage of the receiver portion and the audio output portion thereof;

means connected to the signal output of said amplifier means for transferring a signal of a predetermined actuating frequency received from said amplifier means at a maximum power level while concurrently transferring signals having a frequency other than said predetermined actuating frequency as received from said amplifier means at a relatively lower, non-actuating power level;

a switching transistor having a signal input and a signal output, the input being connected to said signal transferring means and said switching transistor being adapted to be driven into the saturation region by a signal input having an actuating power level and being operated in the cut-off region by a signal input having a relatively lower non-actuating power level;

a relay coil connected to the output of the switching transistor, the relay coil having an energized and a de-energized position, the relay coil being energized by said switching transistor when said switching transistor is operating in the saturation region;

relay contacts operably connected to said relay coil and being interposed between said receiver portion and the audio output portion of the radio, said relay contacts being opened in the de-energized position of the relay coil and being closed in the energized position of the relay coil, whereby electrical continuity between the receiver portion and the audio output portion of the radio is established in the closed position of the relay contacts;

a direct-current power supply electrically connected to said amplifier means, said signal transfer means and said relay coil to supply direct-current operating power thereto, said direct-current power supply being adapted to transform alternating-current supplied thereto to a substantially direct-current, and to be automatically switched from an alternating-current power supply means to a direct-current battery supply in the event the alternating-current power supply means fails, said direct-current power supply means including:

rectifier means connected to the alternating-current power supply means to convert the alternating-current supplied thereto to substantially a direct-current output therefrom;

a second relay coil connected to the alternating-current power supply means having an energized position and a de-energized position, the relay coil being energized by an alternating-current power supply means in electrical continuity therewith;

second relay contacts connected to the rectifier means and being inductively coupled to the second relay coil, the second relay contacts establishing electrical continuity between the said rectifier means and said amplifier means, signal transfer means and first-mentioned relay coil in an energized position of the second relay coil; and a direct-current battery connected to the second relay contacts, electrical continuity being established between the direct-current battery and said signal transfer means in a de-energized position of the second relay coil, direct-current operating power being thereby supplied to the signal transfer means by the direct-current battery in a de-energized position of the second relay coil.

* * * * *